Apr. 3, 1923.

O. BAHLS 1,450,572

REVERSING AND CONTROL SWITCH

Filed Dec. 15, 1921

INVENTOR
O. Bahls
BY C. P. Goepel
ATTORNEY

Apr. 3, 1923. 1,450,572
O. BAHLS
REVERSING AND CONTROL SWITCH
Filed Dec. 15, 1921 9 sheets-sheet 6

INVENTOR
O. Bahls
BY
C. P. Goepel
ATTORNEY

Patented Apr. 3, 1923.

1,450,572

UNITED STATES PATENT OFFICE.

OTTO BAHLS, OF LONG ISLAND CITY, NEW YORK, ASSIGNOR TO O. B. ELECTRIC VEHICLES, INC., OF LONG ISLAND CITY, NEW YORK, A CORPORATION OF NEW YORK.

REVERSING AND CONTROL SWITCH.

Application filed December 15, 1921. Serial No. 522,663.

*To all whom it may concern:*

Be it known that I, OTTO BAHLS, a citizen of the United States, and a resident of Long Island City, in the county of Queens and the State of New York, have invented a certain new and useful Improvement in Reversing and Control Switches, of which the following is a specification.

This invention relates to an improved reversing and control switch for electric motors and has for its primary object to provide improved means for controlling the motor operating circuit whereby the motor may be driven in either direction and at any desired speed.

Generically considered, the present invention contemplates the provision, in a switch of the above character, of means for controlling a variable resistance unit to vary the power output of the motor, including a movable part, said movable part being provided with means for reversing the motor operating circuit. In one embodiment of the invention a conventional type of knife switch is interposed in the circuit. The actuating element for the resistance control means consists of a pivoted lever and upon said lever operating means for the knife switch are mounted whereby said switch may be actuated when the lever is in a predetermined position to close the switch for the operation of the motor in either direction, said switch in all other positions of said pivoted lever being locked against operation.

In another practical construction in which I contemplate embodying the present invention, the motor control and reversing switch includes a movable switch part mounted for pivotal and rectilinear movement with respect to spaced pairs of conductors connected in the motor operating circuit. A variable resistance unit is interposed in the circuit and said resistance unit is automatically controlled by means actuated in the pivotal movement of the switch part while the circuit is closed whereby the strength of the resistance is varied to correspondingly increase or decrease the power output of the motor.

It is a further general object of the invention to provide a motor reversing and control switch as above characterized, the several parts of which are of simple form and compactly arranged so that the switch will be positive and reliable in its action and not liable to get out of order.

With the above and other objects in view, the invention consists in the improved switch construction and in the form, proportion and relative arrangement of its several parts, as will be hereinafter more fully described, illustrated in the accompanying drawings and subsequently incorporated in the subjoined claims.

In the drawings wherein I have disclosed several practical and satisfactory embodiments of the invention and in which similar reference characters designate corresponding parts throughout the several views.

In the construction illustrated in Figs. 1 to 12 inclusive, the body plate 5 of the switch is centrally provided with a hub extension 6 which is secured in any suitable manner upon a rigidly fixed supporting rod 7. Upon one side of the body plate 5 and surrounding the hub 6 thereof a block of hard rubber, fibre or other suitable insulating material 8 is secured. The face of this insulating block 8 is grooved or recessed to receive two pairs of metal conducting plates. For the purpose of differentiation, I have designated one pair of these plates by the numerals 9 and 10 respectively while the other pair of conducting plates are designated 11 and 12 respectively. These conducting plates are semi-circularly curved and arranged in spaced relation to each other concentrically on diametrically opposite sides of the hub portion 6 of the body plate 5. These conducting plates being countersunk in the surface of the insulating block 8, it will be understood that the metallic and insulating surfaces are flush.

Figures 4, 12:
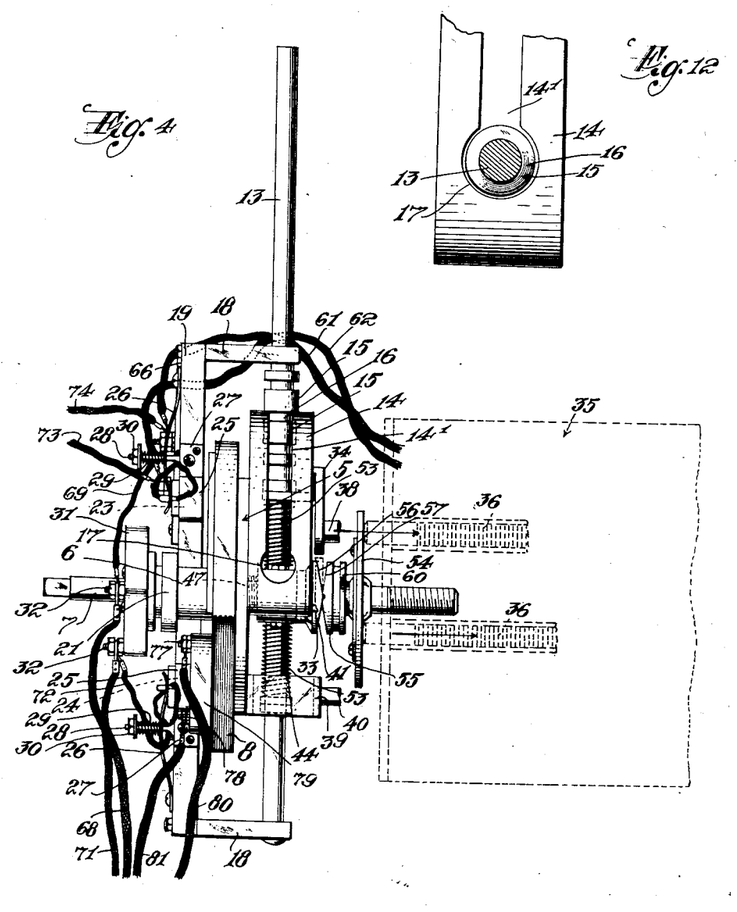
Fig. 4 is a side elevation.
Fig. 12 is a fragmentary plan view of the guide quadrant for the movable switch part.

The movable switch part as herein shown is in the form of a rod 13 which is movable in a guide quadrant 14, said quadrant consisting of a metal plate disposed in spaced concentric relation to the periphery of the switch body 5 and having its ends suitably fixed thereto. This plate is provided with a longitudinally extending slot 14' and the rod 13 is formed with spaced diametrically enlarged portions 15 providing annular grooves 16 in which the opposite edge portions of the slot 14' are adapted to engage. One end of this slot is circularly enlarged as at 17 to permit of the passage of the enlargements 15 therethrough for a purpose which will be hereinafter explained.

To the rod 13 laterally projecting arms 18 are suitably fixed and to these arms the ends of a bar 19 of insulating material are bolted or otherwise rigidly secured. This insulating bar extends across the metal conductor plates 9, 10, 11 and 12 at one side of the hub extension 6 and is provided in its intermediate portion with a longitudinally extending slot 20. A ring or annulus 21 is loosely mounted on the hub 6 and is formed with an angular extension 22 on its periphery which is loosely engaged in the slot 20 of the insulating bar 19. This insulating bar carries two longitudinally spaced contact blocks 23 and 24 respectively which are arranged at one of the side edges of said bar and are movable in the guide straps 25. Each of these contact blocks is urged in one direction towards the switch body by means of the leaf springs 26 which are fixed at one of their ends to the insulating bar 19 and at their other ends have slot and pin connections with the respective contact blocks. In addition to these springs 26, plates 27 are fixed to the edge of the bar 19, each of said plates having a rod 28 which extends loosely through an opening in one of the leaf springs 26. Coil springs 29 are engaged upon each of said rods and bear at one of their ends upon the leaf spring, said coil springs being tensionally adjusted by means of the nuts 30 threaded upon the outer ends of the rods 28. By this means, the bearing pressure of the contact blocks 23 and 24 upon the metal conducting plates may be regulated as desired.

To the end of the hub extension 6 a plate of insulation 31 is securely fixed and carries binding posts 32 to which certain of the circuit wires are attached as will be later referred to.

Figures 3, 8, 9, 10, 11:
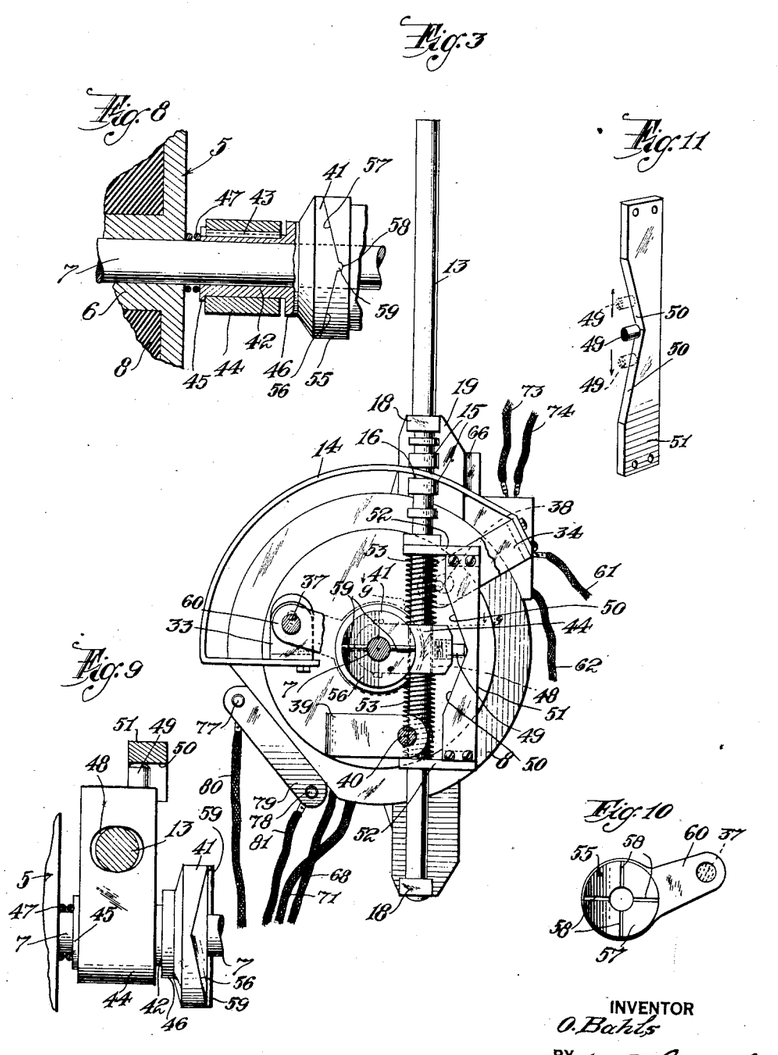
Fig. 3 is a rear elevation.
Fig. 8 is a detail view partly in section of the resistance control means.
Fig. 9 is a detail section taken on the line 9—9 of Fig. 3.
Fig. 10 is a detail elevation of a part of the resistance control means.
Figure 11 is a detail perspective view of one of the parts.

In Figure 3 of the drawings I have shown the quadrant 14 secured to the body plate 5 by means of U shaped brackets 33 and 34 respectively, though any other suitable supporting means for the guide quadrant might be provided.

My improved switch is designed for operation in connection with a variable resistance unit. Preferably, I employ a resistance unit of the carbon pile type. As is well known, in a variable resistance unit of this type, a series of carbon plates or discs are piled in superposed relation. Any multiple number of such carbon piles may be used and an adjustable rod or equivalent member is provided for forcing the carbon plates or discs into close or intimate contact with each other. The closer contact which is obtained between the carbon plates, the less will be the resistance offered by the carbon pile to the passage of the current. In Figure 4 of the drawings I have indicated such a variable resistance unit at 35, said unit being also diagrammatically illustrated in Figure 2 of the drawings. The rods for varying the contact of the carbon plates with each other are indicated at 36. To the casing of the resistance unit 35, one arm of each of the U shaped brackets 33 and 34 may be connected by means of the rods or bolts 37 and 38 respectively as an additional means of support for the switch. A third U shaped bracket 39 fixed to the body plate 5 of the switch may also be similarly connected with the casing of the resistance unit by the rod 40.

From reference to Figure 3 of the drawings, it will be observed that the operating rod 13 for the switch extends across the rear side of the switch body at one side of the supporting rod 7. Upon said rod one of the parts 41 of a resistance control means is loosely mounted, said part having a sleeve extension 42 which is keyed as at 43 in one end of an arm 44. The end of said sleeve is formed with the flange 45 which limits longitudinal movement of the part 41 in one direction and at the other end of said sleeve an annular shoulder 46 is provided for contact with the arm 44 to limit movement of the part 41 in the opposite direction. This part 40 is urged to its normal position by means of a coil spring 47 which is interposed between the flanged end 45 of the sleeve and the body plate 5 of the switch.

The arm 44 is provided with an opening 48 elongated in the axial direction of the rod 7 and through which the switch operating rod 13 extends. This opening permits of a limited shifting movement of the arm 44 relative to the rod 13.

Figures 1, 6, 7:
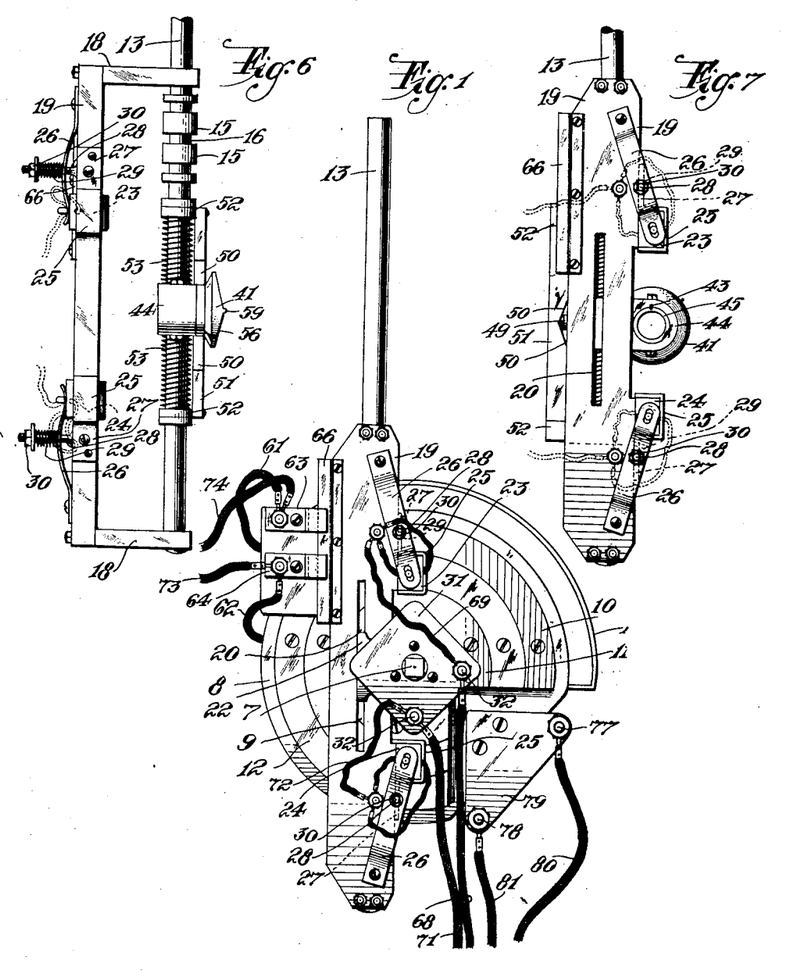
Figure 1 is a front elevation, the switch casing being omitted.
Fig. 6 is a detail side elevation of the movable switch part.
Fig. 7 is a front elevation thereof.
Figures 2, 5:
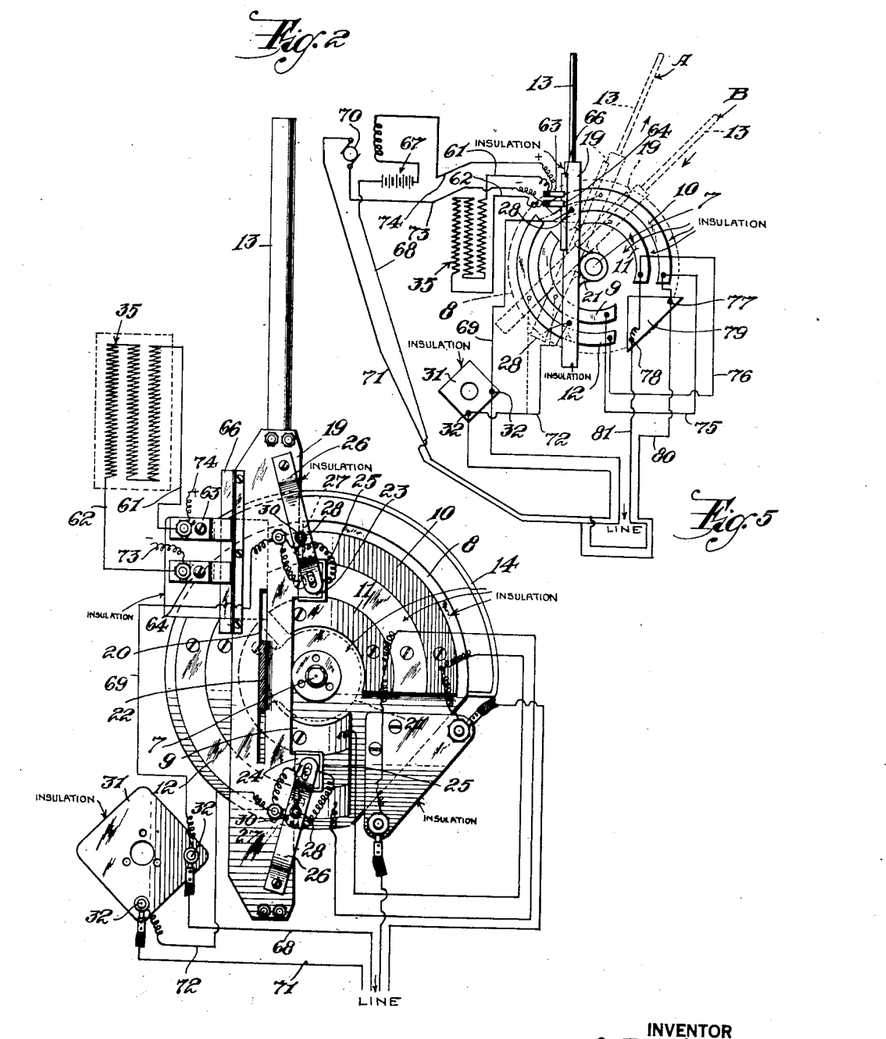
Fig. 2 is a similar view, parts of the switch being removed from operative position.
Fig. 5 is a diagrammatic view showing the circuit connections between the source of current, the motor and the parts of the switch.

A spring pressed pin 49 is mounted in the arm 44 at the outer side of the rod 13 and engages the oppositely inclined cam edges 50 of a metal bar 51 which is secured to spaced brackets 52 fixed to the rod 13. Between these brackets and the arm 44 coil springs 53 are arranged upon the operating rod. These springs tend to hold the operating rod 13 in a normal position as shown in Figures 2 and 3 in which the switch contacts 23 and 24 are disposed in a neutral position upon the insulating block 8. The pin 49 being frictionally engaged with the bar 51 at the meeting ends of the cam edges 50 operates to prevent the casual shifting movement of the operating rod from its neutral position.

Upon the rod 7 in opposed relation to the ends of the rods 36, a disc 54 is mounted for longitudinal movement and carries a part 55 with which the part 41 is adapted to coact. The opposed faces of the parts 41 and 55 have cam surfaces 56 and 57 respectively. The part 55 is provided with diametrically extending grooves 58 between its cam surfaces which are adapted to receive a rib 59 on the opposed face of the part 56.

It will be understood that the rods 36 are normally urged outwardly by suitable springs or other means to relieve the contacting pressure of the carbon discs or plates upon each other so that the maximum resistance is offered to the passage of the current. In this normal condition of the variable resistance unit, the cam surfaces of the two parts 55 and 56 are in engagement as shown in Figure 8 of the drawings.

The part 55 is provided with a laterally extending arm 60 which is loosely engaged upon the rod 37. This rod serves as a guide for the part 55 and plate 54 and prevents their rotative movement on the rod 7.

The terminal wires 61 and 62 of the variable resistance unit are connected to contact plates 63 and 64 respectively secured upon the slab of insulation 55 which is suitably fixed to the body of the switch. With these spaced contact plates a metal strip 66 fixed to the movable insulating bar 19 is adapted to engage to short-circuit the resistance unit.

In Figure 5 of the drawings I have diagrammatically illustrated a typical operating circuit for motor driven vehicles in which the improved switch is included. The current is obtained from one or more storage batteries of the requisite capacity as indicated at 67. One pole of the battery is connected by the wire 68 to one of the binding posts 32 and a wire 69 also secured to said binding post is connected to the contact block 23 carried by the movable switch part. The motor shown at 70 is provided with a series field and has one side of its armature connected by wire 71 to the other binding post 32 and a wire 72 connected to said binding post is in electrical connection with the other of the contact blocks 24. The other side of the motor armature is connected by the wire 73 to the contact plate 64 and a wire 74 connects the other of said contact plates to the opposite pole of the battery 67.

The insulted conductor plates 9, 10 and 11, 12 respectively, are electrically connected with each other by the wires 75 and 76 respectively. The plates 10 and 11 are also electrically connected to spaced binding posts 77 and 78 respectively on the slab of insulation 79 which is suitably fixed to the insulation block 8. The binding post 77 is connected by a wire 80 to the wire 68 leading to the storage battery while the other binding post 78 is connected by a wire 81 to the wire 71 leading to the motor.

In the drawings I have illustrated the movable switch part in a neutral position with the contact blocks 23 and 24 bearing upon the surface of the insulation 8 between the metal conducting plates 10, 11 and 9, 12 respectively. It will also be noted that in the full line position of this switch part shown in Fig. 5, the metal strip 66 is in engagement with the contacts 63 and 64. In this position of the switch part it is locked against rectilinear movement by the engagement of quadrant plate 14 in the intermediate groove 16 on the rod 13 and before said part can be shifted rectilinearly to engage its contacts 23 and 24 upon the conducting plates, said switch part must be swung through an arc of substantially 90° to a horizontal position so that the enlarged portions 15 of the rod may pass through the enlargement 17 of the slot 14 in the quadrant plate. In this position of the switch member the two parts 55 and 56 of the resistance unit control means will be disposed in the relative positions seen in Figure 8 and a maximum resistance will be offered to the passage of the current when the switch part is shifted to engage its contacts with the conducting plates so that there will be a low power output from the motor. Assuming that the switch part is moved in the direction of its length and the contacts 23 and 24 respectively engaged upon the conducting plates 9 and 10 and said switch part then swung to the dotted line position A in Figure 5, in such swinging movement, the arm 44 is of course also moved to rotate the part 41. At the start of this movement the rib 59 on said part is forced out of the groove 58 in the complementary part 55, said part 41 moving axially on the rod 7 against the resistance of spring 47 until the shoulder 46 engages the arm 44. The rib 59 will then coact with the cam surface portions of the part 55 on diametrically opposite sides of the rod 7 so that said part together with the plate 54 will be moved longitudinally on the rod in the direction of the arrows in Figure 4, thus forcing the rods 36 inwardly and compressing the carbon plates or discs into close contacting relation. The intimacy of such contact between the carbon plates is increased during the upward swinging movement of the switch part to the position A and the resistance offered to the passage of the current is correspondingly decreased. In this position of the switch part the circuit may be traced as follows: from one pole of the battery 67 through wires 68 and 69 to the contact 23; through conductor plate 10, wire 75 and conductor plate 9 to the other contact 24; then through wires 72 and 71 to one side of the motor armature 70; then from the opposite side of the motor armature through wire 73 to contact 64, thence through the resistance unit 35 and from the other contact 63 through wire 74 back to the battery. In this circuit, the conducting plates 9 and 10 are connected to the battery through the wire 80. Thus the motor will be driven in one direction and at a speed determined by the angular position of the movable switch part which controls the resistance offered by the resistance unit 35 to the passage of the current from the battery to the motor.

By moving the switch part from the dotted line position A to the full line position shown in Figure 5, the contacts 63 and 64 are engaged with the metal strip 66, thus short-circuiting the resistance unit so that a maximum power out-put from the motor is obtained. When it is desired to reverse the motor, the switch part is again moved so as to position the rod 13 in alignment with the enlarged end 17 of the slot 14 and said switch part then shifted to engage the contacts 23 and 24 with the conductors 11 and 12 respectively. If the switch part is now swung to the dotted line position B seen in Figure 5, the resistance will be decreased. The motor is now operated in a reverse direction, the circuit being as follows: from the battery through wire 74 and through the resistance unit 35 and wire 73 to one side of the motor armature, then through wires 71 and 72 to contact 24, then through the connected conducting plates 11 and 12 to the other contact 23, wires 69, 81 and 68 back to the battery. Also, in this position of the contacts 23 and 24 with relation to the conductor plates, the switch part may be moved to the position seen in full lines and thereby short-circuit the resistance unit. Thus by means of a single operable switch part, the resistance is automatically controlled and varied to operate the motor in either direction at a desired speed. When the switch part is moved to either of the positions A or B, one of the springs 53 is placed under tension and while the manual swinging movement of the switch part may be readily performed, sufficient friction of the enlargements 15 of the rod 13 upon the quadrant plate is produced in order to prevent a casual shifting movement of the switch part from its adjusted position which would result in an unintentional variation of the resistance.

In Figs. 15 to 32 inclusive, of the drawings I have illustrated another embodiment of the present invention, and one which, for various reasons, may be deemed preferable. In many respects this construction is similar to that above described, but differs therefrom, in that a separate reversing switch is interposed in the circuit and is actuated by means carried by the lever which actuates the resistance control means, said lever in this case having a pivotal movement only. As illustrated, the actuating lever 82 for the resistance control means is fixed to one end of a shaft 83 extending through the slab of insulating material 84. Upon one side of this insulating slab or body 84 and above the shaft 83, the concentric conductor plates 85 are fixed. At one end of one of these conductor plates and in spaced alignment therewith, a relatively short plate 86 is secured upon the insulating slab 84 for a purpose which will be later disclosed. The lever 82 carries spaced contact members 87 which are respectively secured to the intermediate portion of a spring plate 88 fixed at one of its ends to an insulating bar 89 carried by the lever 82 and having sliding bearing contact at its other end upon said bar. The two contact members 87 are connected to each other by a ductile or flexible strip of metal 90.

On the shaft 83 at the opposite side of the insulating body 84, a gear segment 91 is fixed and has constant meshing engagement with a similar gear segment 92 secured on a second shaft 93 which is mounted in a suitable bearing bracket 94 rigidly connected by means of the rods 95 to the casing of a variable resistance unit 96. Upon the shaft 93 a cam member 97 is mounted for rotation therewith by means of the screw 98 engaging in a key-way in said shaft. This cam member is urged in one direction to its normal position by means of the spring 99.

A shaft 100 is disposed in axial alignment with the shaft 93 and is mounted in the casing of the resistance unit, said shaft having a plate 101 oscillatably supported thereon for bearing contact with the compression rods of the resistance unit. The end of the shaft 100 is bored to telescopically receive the opposed end of the shaft 93 and upon the shaft 100 a complementary cam member 102 is fixed. A spring 103 surrounding the shaft 100 between the casing of the resistance unit and the plate 101 yieldingly holds the opposed cam surfaces of the members 97 and 102 in coacting engagement. This cam means operates in a similar manner to that shown in Fig. 8 of the drawings and as above described, for varying the effective strength of the resistance in the pivotal movement of the lever 82. The cam member 102 is held against a turning or rotative movement by means of the arm 104 which is fixed thereto and has sliding engagement upon one of the rods 95.

Upon the insulating slab 84 a knife switch 105 is mounted, the switch blades being pivoted to the spaced posts 106 and adapted for engagement with the spaced circuit closing contacts 107 and 108 respectively which are arranged at opposite sides of the posts 106. The head 109 of the movable switch part which connects the switch blades, is provided in one of its ends with a slot or opening 110 in which a longitudinally disposed rod 111 is arranged. A rod 112 is rotatably and axially movable in spaced bearings 113 on the insulation slab 84 and to one end of said shaft an arm 114 is fixed.

The end of this arm extends through the opening 110 in the switch head 109 and is loosely engaged upon the rod 111. The other end of the rod 112 is provided with one of the yoke parts 115 of a universal joint or pivotal connection, the other yoke part 116 being fixed to the inner end of a rod 117 which is mounted for rotative and axial movement upon the lever 82. The pivotal axis 118 of this universal connection is normally disposed in exact coinciding axial alignment with the shaft 83.

Figures 13, 28, 29, 30, 31, 32:
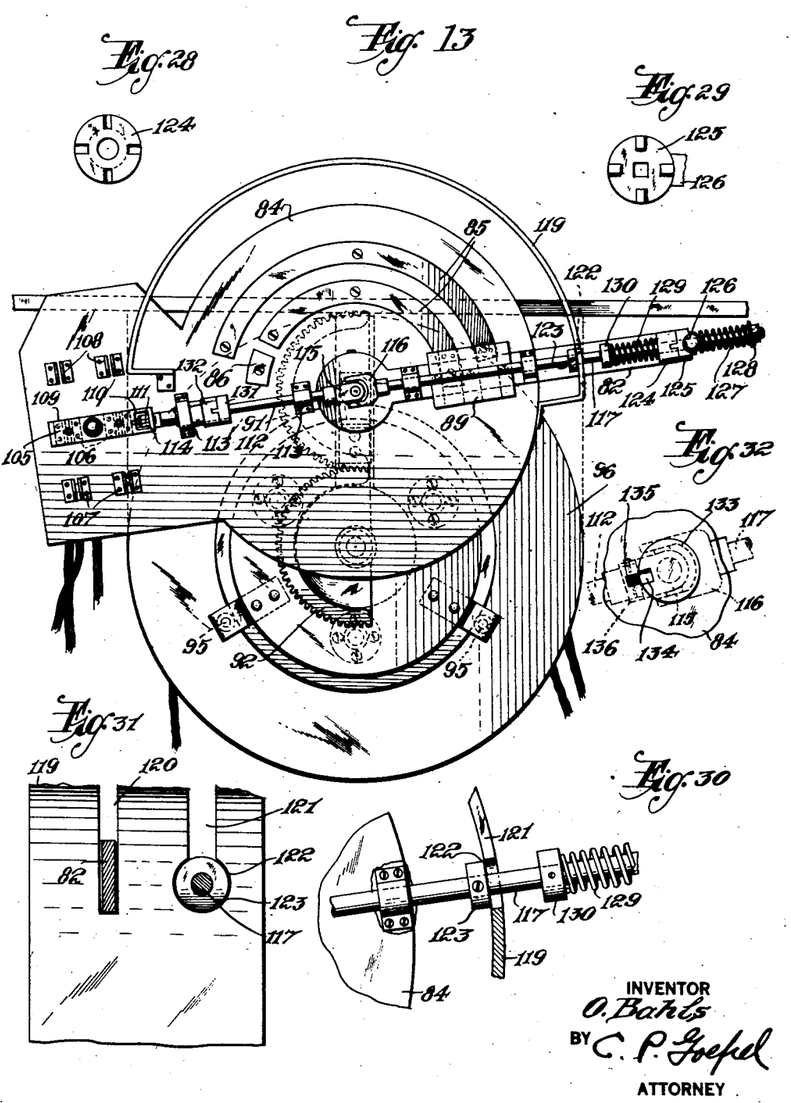
Fig. 13 is an elevation illustrating another embodiment of the invention, the reversing switch being open.
Figs. 28 and 29 are detail views of the complementary parts of one of the locking clutches for the switch actuating means.
Fig. 30 is a fragmentary elevation of such switch actuating means.
Fig. 31 is a fragmentary view showing the arrangement of the resistance control lever and switch actuating means in the guide therefor.
Fig. 32 is a fragmentary elevation partly in section showing an alternative means for locking the reversing switch against movement in the manipulation of the resistance control lever.
Figures 14, 24, 25, 26, 27:
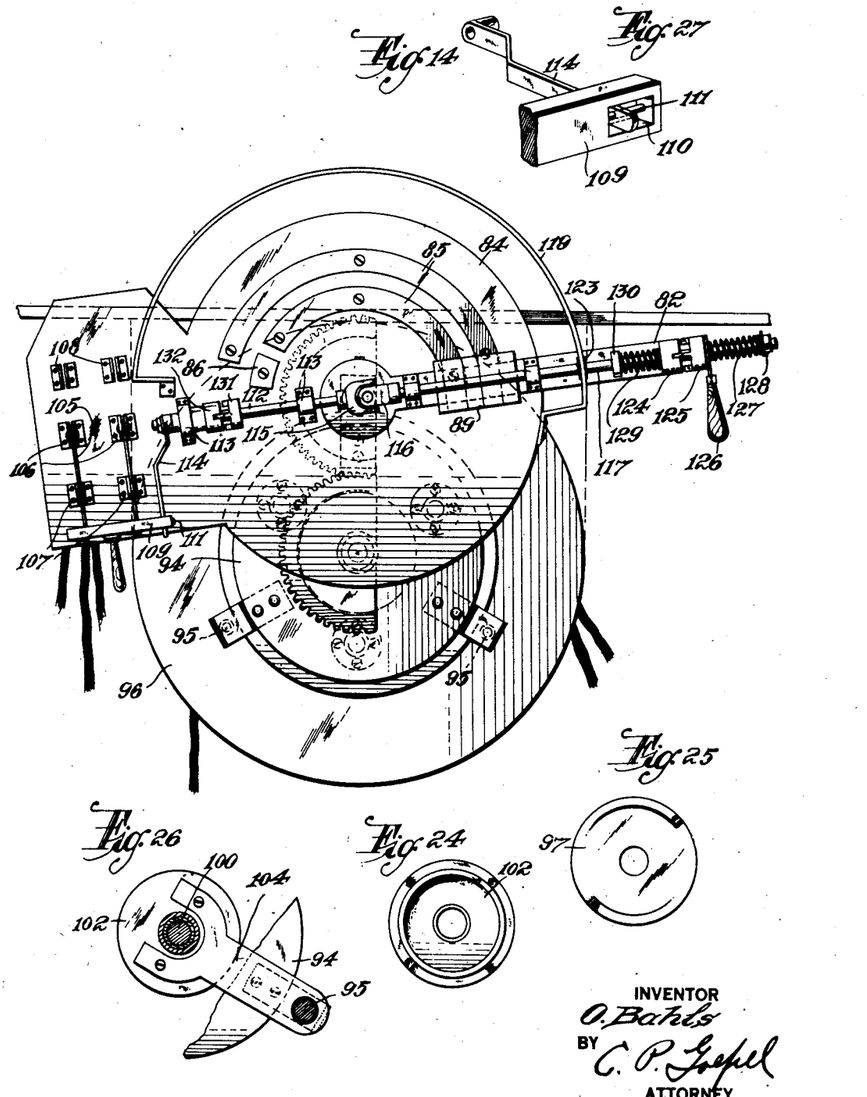
Fig. 14 is a similar view showing the reversing switch closed.
Figs. 24 and 25 are views of the opposing faces of said cam members.
Fig. 26 is a detail section taken on the line 26—26 of Fig. 16.
Fig. 27 is a detail perspective view of a part of the operating means for the knife switch.

The lever 82 is movable in a slot 120 provided in a guide quadrant 119 fixed at its ends to the insulation slab 84. This quadrant is also provided with a second slot 121 to receive the rod 117 which is mounted upon one side of said lever and supported in suitable bearings in spaced relation thereto. One end of this latter slot is enlarged as at 122 to accommodate a collar 123 fixed upon the rod 117 when the lever 82 is at the limit of its movement in one direction and positioned in one end of the slot 120. The outer end of the lever 82 is angularly disposed to provide a bearing for the rod 117 and to also form a fixed clutch element 124 with which a complementary clutch element 125 on the rod 117 is adapted to coact. These clutch elements, as shown in Figs. 28 and 29 of the drawings, are provided with the usual interlocking tongues and recesses and the element 125 is preferably engaged upon a squared or rectangular portion of the shaft 117. To said clutch element a suitable operating handle 126 is fixed. A spring 127 is arranged between the clutch element 125 and a washer plate 128 on the end of the shaft 117. A second relatively stronger spring 129 is also arranged upon said shaft between the fixed clutch element 124 and the collar 130 secured upon the shaft.

The shaft 112 is normally locked against rotation by means of a clutch element 131 fixed thereon and coacting with a complementary clutch element 132 which projects from one side of the bearing 113.

Figures 15, 18, 22, 23:
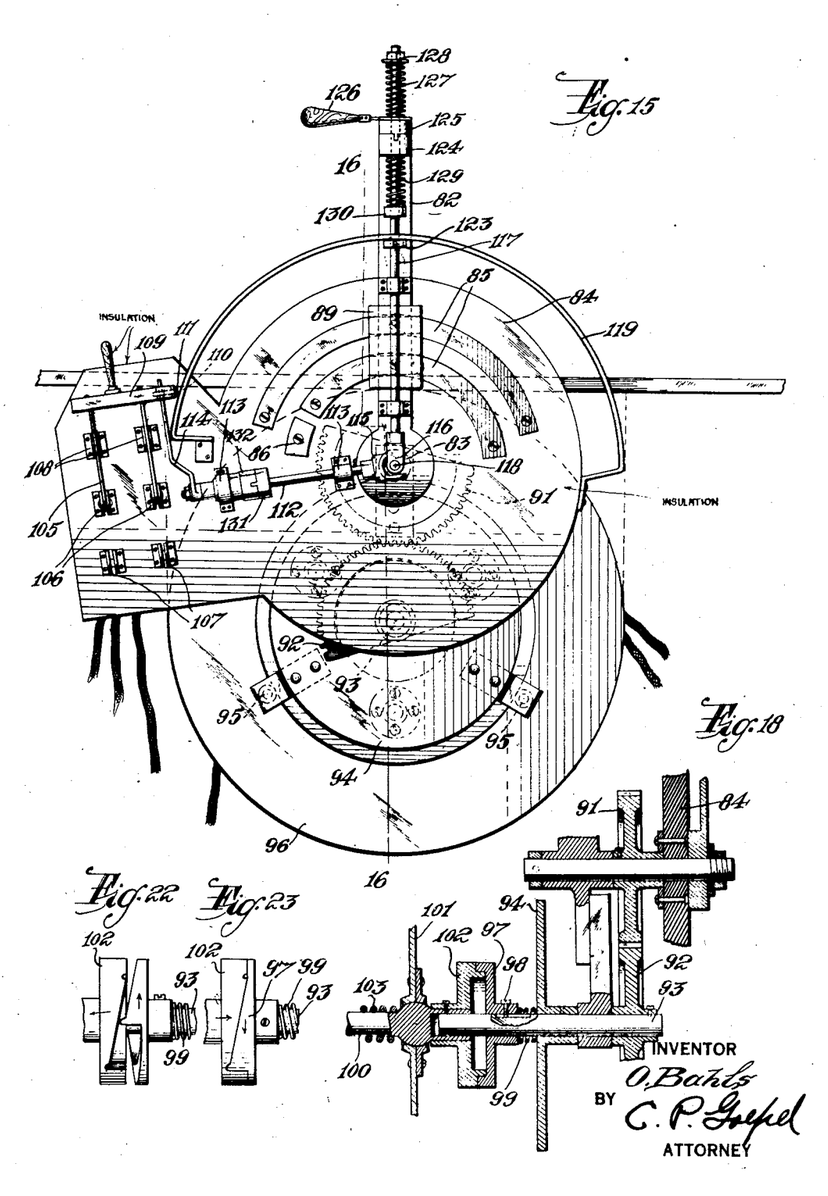
Fig. 15 is a view similar to Fig. 14 showing the switch in the reverse position and the resistance control lever moved to an intermediate position.
Fig. 18 is a detail vertical section of the automatic control means for the resistance unit.
Figs. 22 and 23 are detail elevations showing different positions of the cam members for actuating the resistance unit.
Figures 16, 20, 21:
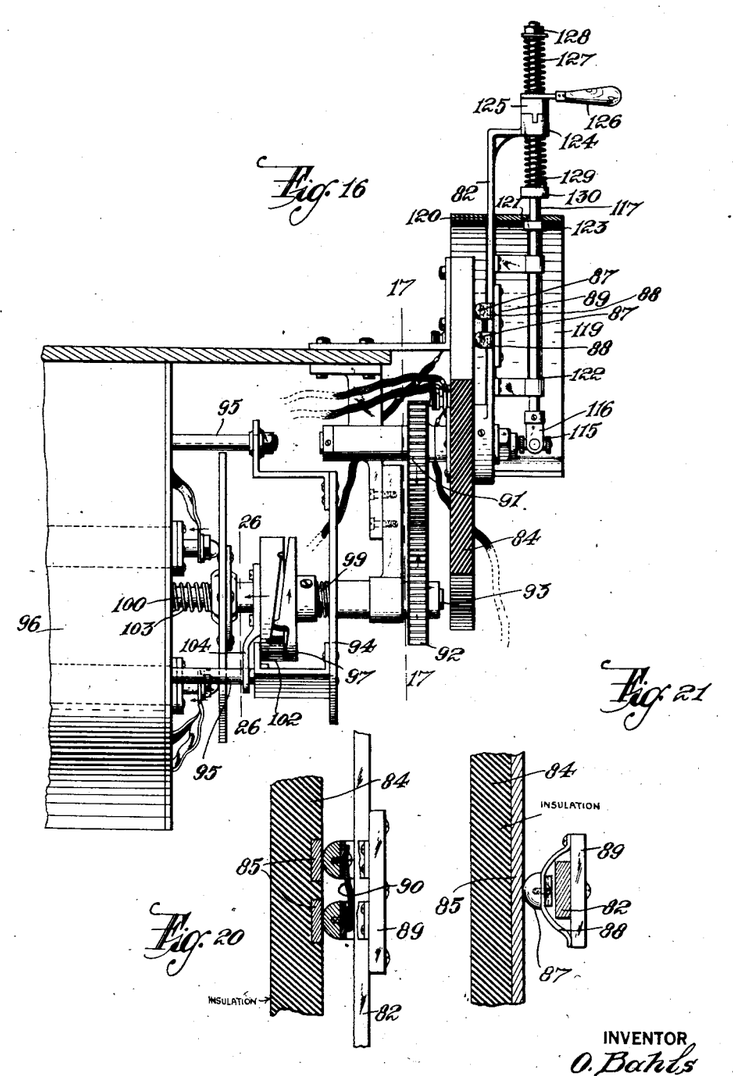
Fig. 16 is a vertical section taken on the line 16—16 of Fig. 15.
Figs. 20 and 21 are detail sectional views showing the means for closing the circuit through the resistance.
Figure 17:
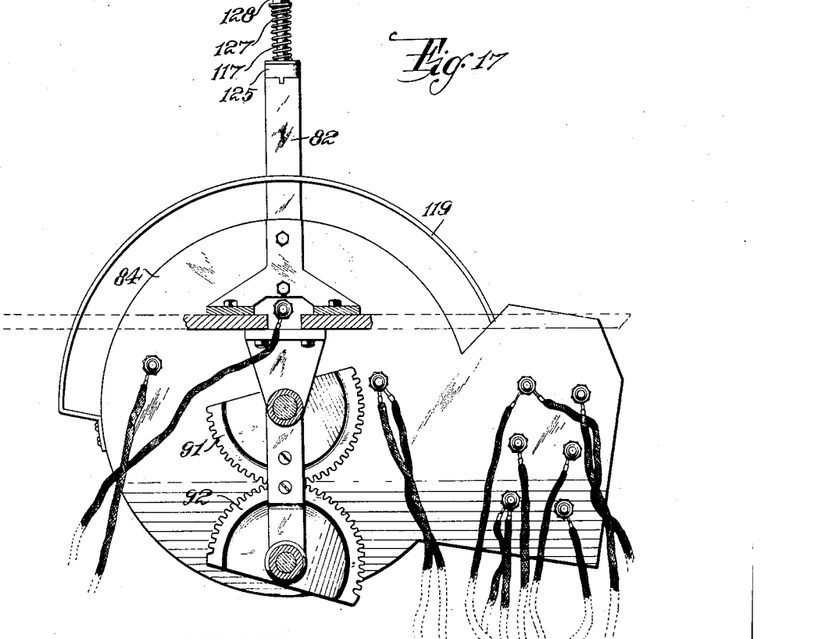
Fig. 17 is a section taken on the line 17—17 of Fig. 16.

By reason of the construction just described, it will be understood that when the lever 82 and shaft 117 are positioned in the respective slots 120 and 121 in the guide quadrant 119, as seen in Fig. 31, the handle 126 may be grasped and the shafts 117 and 112 moved longitudinally from their normal position, seen in Fig. 13, thereby disengaging the clutch elements 125 and 131 from the opposed clutch elements 124 and 132 respectively, the collar 123 on the shaft 117 moving through the enlarged end 122 of the slot 121. The two shafts may now be rotated as a unit so that the movable part of the knife switch will be swung from the neutral position seen in Fig. 13 to the position shown in Fig. 14 to close the motor circuit in one direction, or on the other hand, the movable switch part may be thrown to the position seen in Fig. 15 to close the circuit in the opposite direction. As soon as the knife switch has been closed, the handle 126 is released. The spring 129 then immediately acts to return the shafts to their normal position and again engage the clutch members so that the shafts will be locked against rotation and the axes 118 of the flexible connection between said shafts again positioned in axial alignment with the shaft 83. The collar 123 on the shaft 117 will then be located at the inner side of the quadrant plate 119 as seen in Figures 13 and 15 of the drawings. Therefore, in the upward pivotal movement of the lever 82, said collar coacting with the plate 119 will lock the shaft 117 against outward movement, and of course, through the medium of the flexibly connected yoke members 115 and 116, the shaft 112 is thereby also locked and the reversing switch retained in its closed position.

In Fig. 32 I have shown an alternative for the locking means for the reversing switch in which a collar or disc 133 is fixed on the end of the shaft 83 and is provided with a notch or recess 134 in its edge to receive a lug 135 projecting from a collar 136 which is loosely mounted upon the hub portion of the yoke member 115. When the shafts 112 and 117 are in alignment, as in Fig. 13, they may be moved longitudinally to disengage the clutch elements since the lug 135 is then in alignment with the recess 134. When, however, the lever 82 is pivotally moved, the disc or collar 133 is also rotated so that the recess 134 is out of registering relation with the lug 135 and the disc then acts as a stop to prevent longitudinal shifting movement of the shafts. It is of course understood that in the use of this construction, the collar 123 on the shaft 117 is dispensed with.

Figure 19:
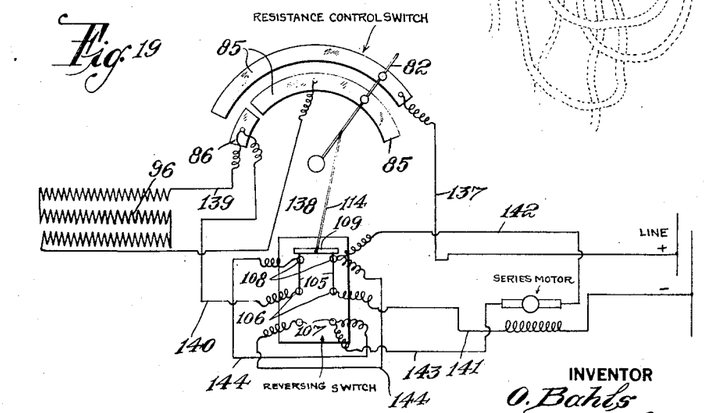
Fig. 19 is a diagrammatic view illustrating the motor operating circuit.

In Fig. 19 of the drawings I have illustrated the operating circuit for use in connection with this form of my invention. From reference thereto it will be seen that one side of the circuit from the batteries or other source of current is connected by the wire 137 to one of the conductor plates 85. The other conductor plate is connected by the wire 138 to one terminal of the electric resistance unit 96, the other terminal of which is connected by wires 138, 139 to the plate 86. This plate 86 is also connected by wire 140 to one of the switch posts 106. The other of said switch posts is connected by wire 141 to the opposite side of the current supply source. A wire 142 connects one side of the motor field to one of the switch contacts 108, the opposite side of the motor field being connected by wire 143 to one of the switch contacts 107. Each of the contacts 107 is connected to one of the contacts 108 by a wire 144. With the circuit connections as just explained, the operation of this embodiment of my invention will be understood as follows:

When the lever 82 is in the position shown in Fig. 13, the contacts 87 are out of engagement with the conductor plates 85. The switch actuating means carried by this lever is then operated to move the knife switch to closed position in engagement with either pair of the contacts 107 or 108. When the lever 82 is now swung upwardly and the contacts 87 engage with the respective conductor plates 85, the operating circuit for the motor is closed. Assuming that the movable switch part is disposed in the position seen in Figure 19 of the drawings, the circuit may be traced as follows:

From the source of current through wire 137 to one of the conductor plates 85 through the connected contacts 87 and the other conductor plate, then through wire 138 and the resistance piles, wires 139 and 140 to one of the switch posts 106, through one of the switch blades and wire 144 to one of the contacts 107, then through wire 143 to one side of the motor, from the opposite side of the motor through wire 142, the other switch blade, and wire 141 back to the source of current through the motor field. When the knife switch is moved to the reverse position of that shown in Fig. 14, the direction of the current is reversed and the current now flows through wire 137, the conductor plates and the resistance unit as above described, then through wire 140 to the post 106, the switch blade and one of the contacts 107 through wire 144 and wire 142 to one side of the motor then from the opposite side of the motor through wire 143 to contact 107, then through the other switch blade and wire 141 back to the current supply source through the motor field. The strength of the resistance which is included in the circuit and consequently, the speed of operation of the motor, is determined by the actuation of the lever 82 in the same manner as previously described. When the lever is shifted to the extreme left hand position, one of the contacts 87 is disposed upon the conductor plate 86 while the other contact 87 remains upon the other of the conductor plates 85. Thus the resistance unit 96 will be short-circuited and the maximum power output from the motor obtained.

From the foregoing description considered in connection with the accompanying drawings, the construction, and manner of operation of my improved motor reversing and control switch will be clearly understood. The several parts of the new switch construction are relatively simple as well as compact in their arrangement so that the device will be positive and reliable in its operation. I have herein shown and described several practical constructions of the improved switch, but it will be manifest that in practice, many other alternative constructions might be devised and I accordingly reserve the privilege of adopting all such legitimate modifications in the form, proportion and arrangement of the several parts as may be clearly embodied within the spirit and scope of the invention as claimed.

I claim:

1. In combination with an electric current control switch, including a pivotally movable lever and an electrical circuit in which said switch is connected, means for reversing the circuit partially mounted upon and carried by said lever and operable only in the open position of said lever to reverse the circuit.

2. In combination with an electric current control switch, including a pivotally movable lever and an electrical circuit in which said switch is connected, means for reversing the circuit including a part operable only in the open position of said lever to reverse the circuit, and means acting to lock said part against actuation in the pivotal movement of the lever while in circuit closing position.

3. In combination with an electric current control switch, including a pivotally movable lever and an electrical circuit in which said switch is connected, means for reversing the circuit including a part carried by said lever and operable independently thereof to reverse the circuit only when said lever is in its open position, and means coacting with said part to lock the same against effective operation during the pivotal movement of said lever while in circuit closing position.

4. In combination with an electric current control switch, incuding a pivotally movable lever and an electric circuit in which said switch is connected, a separate switch for reversing said circuit, and actuating means for said reversing switch comprising flexibly connected shaft sections, one of said shaft sections being mounted upon said lever for independent manual operation.

5. In combination with an electric current control switch, including a pivotally movable lever and an electric circuit in which said switch is connected, a separate switch for reversing said circuit, actuating means for said reversing switch comprising flexibly connected shaft sections, one of said shaft sections being mounted upon said lever for independent manual operation, and coacting means to lock said latter shaft section against effective operation while said lever is in circuit closing position.

6. In combination with an electric current control switch including a pivotally movable lever and an electric circuit in which said switch is connected, a separate reversing switch for the circuit, a rotatably mounted shaft operably connected to the movable switch part, means connected to said shaft and carried by said lever and operable only in the open position of the lever to actuate the reversing switch, and means coacting with the switch operating means on said lever to lock said means against operation while the lever is in circuit closing position.

7. In combination with an electric current control switch, including a pivotally movable lever and an electrical circuit in which said switch is connected, a variable resistance unit of the carbon pile compression type in said circuit, relatively movable coacting parts one of which is engaged with the compression means of the resistance unit, and means operatively connecting the other of said parts to the switch lever to rotate said latter part in the pivotal movement of the lever and thereby vary the resistance.

8. In combination with an electric current control switch, including a pivotally movable lever and an electrical circuit in which said switch is connected, a variable resistance unit of the carbon pile compression type in said circuit, a movable member engaged with the compression means of the resistance unit, a member coacting with said movable member, and means operatively connecting the second named member to the switch lever whereby said movable member is actuated in the pivotal movement of the lever to vary the resistance.

9. In combination with an electric current control switch, including a pivotally movable lever and an electrical circuit in which said switch is connected, a variable resistance unit of the carbon pile compression type in the motor circuit, and means for actuating the compression means of the resistance unit in the pivotal movement of said lever, said means comprising coacting cam parts, and a geared connection between one of said cam parts and the axis of said lever to transmit rotation to said cam part in the pivotal movement of the lever and thereby actuate the other cam part to vary the resistance.

10. In combination with a motor control switch including a part mounted for pivotal movement while maintaining a closed circuit, a variable resistance unit of the carbon pile compression type in the motor circuit, a movable member to coact with the compression means of the resistance unit, a second movable member, said members having coacting cam surfaces, and means operatively connecting the movable switch part to the second named member to actuate the latter in the pivotal movement of the switch part and thereby vary the resistance.

11. In combination with a motor control switch including a part pivotally movable while maintaining a closed circuit, a variable resistance unit of the carbon pile compression type in the motor circuit, automatic control means for the resistance unit comprising a rectilinearly movable element to engage and operate the compression means, a rotatable element, said elements having coacting cam surfaces and means operatively connecting the rotatable element to the switch part to rotate said element upon the pivotal movement of the switch part and thereby actuate the rectilinearly movable element to vary the resistance.

12. In combination with an electric motor and its circuit having a variable resistance unit therein, a reversing switch means for varying the resistance including a pivotally mounted lever operable to open and close the circuit while the reversing switch is closed, and means for actuating the reversing switch to reverse the operation of the motor or dispose the said switch in neutral position, said means including a manually operable part carried by and movable with said lever.

13. In combination with an electric motor and its circuit having a variable resistance unit therein, a reversing switch means for varying the resistance including a pivotally mounted lever operable to open and close the circuit while the reversing switch is closed, means for actuating the reversing switch, including a manually operable part carried by and movable with said lever, and means for locking said manually operable part against actuation in the movement of said lever while in circuit closing position.

14. In combination with an electric motor and its circuit having a variable resistance unit therein, a reversing switch in said circuit, means for varying the resistance including a pivotally mounted lever operable to open and close the circuit in the closed position of said switch, and means for actuating said switch to reverse the circuit including a shaft having an arm operatively connected to the movable switch part, and means carried by said lever and operable only in the open position thereof to actuate said shaft.

15. In combination with an electric motor and its circuit having a variable resistance unit therein, a reversing switch in said circuit, means for varying the resistance including a pivotally mounted lever operable to open and close the circuit in the closed position of said switch, means for actuating said switch to reverse the circuit including a shaft having an arm operatively connected to the movable switch part, a second shaft mounted upon said lever for operation independently thereof and flexibly connected at one of its ends to said first named shaft, and means preventing the effective operation of the second named shaft in all positions of said lever while the circuit is closed, but permitting of such operation when said lever is in its open position whereby the first named shaft is actuated to operate the movable switch part.

16. In combination with an electric motor and its circuit having a variable resistance unit therein, a reversing switch having means for varying the resistance including an operating member, and means rendered effective automatically upon an operative movement of said member to lock the reversing switch in closed position.

In testimony that I claim the foregoing as my invention, I have signed my name hereunder.

OTTO BAHLS.